RALPH S. COLBY
JAMES G. KAKATSAKIS
DOUGLAS S. WILSON
*INVENTORS*

BY
ATTORNEYS

RALPH S. COLBY
JAMES G. KAKATSAKIS
DOUGLAS S. WILSON
*INVENTORS*

ATTORNEYS

United States Patent Office 3,153,926
Patented Oct. 27, 1964

3,153,926
SHOCK TRANSFORMATION FIXTURE
AND SYSTEM
Ralph S. Colby, Boxford, James G. Kakatsakis, Needham, and Douglas S. Wilson, Chelmsford, Mass., assignors to Avco Corporation, Cincinnati, Ohio, a corporation of Delaware
Filed Jan. 26, 1961, Ser. No. 85,136
15 Claims. (Cl. 73—12)

This invention relates to means for producing a high amplitude shock pulse. More particularly, the invention relates to a transformation means and a system for transforming low amplitude shock excitation to a high amplitude shock pulse.

For purposes of this discussion, shock excitation having a magnitude in the order of 100 $g$'s will be considered to be low amplitude shock conditions. High amplitude shock conditions will be in the order of 1,000 $g$'s. In the foregoing, "$g$" is a constant multiplier and designates the acceleration of a free falling object under the influence of gravity.

The severity of shock excitation on a test specimen or a machine component is measured by both the amplitude and duration of the shock excitation applied to the test specimen. Generally, the duration of the shock excitation is very short; i.e., a pulse. Of the two, amplitude and duration, the former is of more immediate interest.

Heretofore, test procedures on components were limited to low amplitude shock conditions, typically a 100 $g$ peak amplitude 6.0 millisecond saw tooth shock pulse or 100 $g$–11 millisecond half-sine pulse.

With the advent of the missile and space age, components are required to operate satisfactorily under shock environment in the order of 1000 $g$'s in order to qualify, although for a much shorter duration than has been required for low amplitude shock conditions. To illustrate, practitioners are working to a specification that requires components to undergo 3,000 $g$'s for 0.2 millisecond and 1500 $g$'s for 0.5 millisecond.

The prior art does not disclose a simple and inexpensive means for producing high amplitude shock pulses and, in particular, means for testing components under high amplitude shock conditions.

It is an object of the invention to provide a fixture, including a specimen holder, for generating and subjecting specimens to high amplitude shock pulses.

It is still another object of the invention to provide shock testing systems which include a low amplitude shock excitation means and a fixture for transforming the low amplitude shock excitation to a high amplitude shock pulse.

It is still another object of the invention to provide a fixture for transforming low amplitude shock excitation to high amplitude shock pulses which includes means for adjusting the transformation ratio.

It is yet another object of the invention to provide fixtures for transforming low amplitude shock excitation to high amplitude shock pulses which are substantially free of vibration.

In accordance with the invention, a shock transformation fixture for transforming low amplitude shock excitation supplied at a surface into a high amplitude shock pulse comprises a housing designed to be secured to the surface supplying the shock excitation. The housing includes peripheral walls which are designed to extend transversely from the surface. The peripheral walls define a bottom opening which conforms to the surface, a side opening, and a top opening. The housing also includes resilient members, preferably rubber, secured to the interior surfaces of the peripheral walls. The resilient members are shaped to define a compartment which includes the bottom opening.

A stress member comprising a tray—which also acts as a specimen holder—inserted loosely within a lower compartment is also included in the shock transformation fixture. The tray is inserted and removed from the housing through the aforementioned side opening.

A cover, pivotally attached to the peripheral walls, is supplied for the top opening. The cover includes a foam rubber pad which hangs down from the cover into the tray and secures specimens placed in the tray for testing purposes.

Also in accordance with the invention, a system for transforming low amplitude shock excitation into high amplitude shock pulses comprises the foregoing fixture and a low amplitude shock excitation means secured thereto.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

*Theory of Operation*

Figure 1:
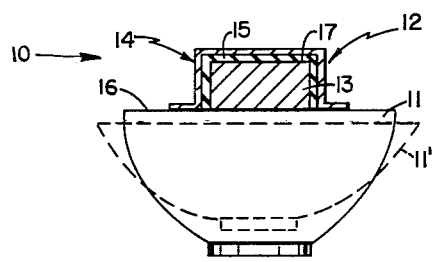
FIGURE 1 is a schematic representation of a transformation system embodying the principles of the present invention which is useful in describing the theory and operation of the invention.

Referring to FIGURE 1 of the drawings, there is represented, schematically, a transformation system 10 for transforming low amplitude shock excitation to high amplitude shock pulses. The system includes means for supplying low amplitude shock excitation, preferably a carriage 11, of a shock testing machine. Mounted to the carriage 11 is a transformation fixture 12 comprising a stress member 13 and a restraining means 14; the latter is to loosely constrain the stress member 13 to a surface 16 of the carriage 11. Interposed between the restraining means 14 and the stress member 13 is resilient material 15, preferably rubber, for preventing spurious signals from reaching the stress member 13 from the restraining means 14.

In the Jensen et al. Patent, 2,955,456, there is described a shock testing machine. The curves and values to be given hereafter relate to procedures conducted on a machine such as described in the patent. Manifestly, the values are considered to be illustrative and not limiting or exhaustive of the possibilities that may arise with other equipments. The operation is typical, however.

Figure 2A:
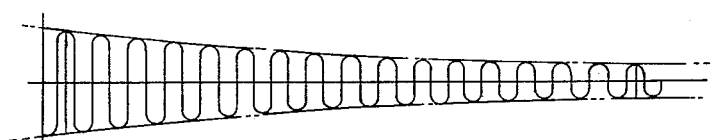
FIGURES 2A, 2B depict curves that are useful in describing the invention.

To perform a shock transformation, the carriage is dropped on the anvil without using a shock absorbing device, such as the lead pellet described in the referenced patent. As a result, an excitation pattern, such as is illustrated in FIGURE 2A, is generated within the carriage. It will be noted that the excitation pattern can be generally classified as a high frequency vibration within a decreasing amplitude envelope.

Referring to FIGURE 1 of the drawings, there is depicted the aforementioned carriage 11 and a dotted carriage designated 11'. When the carriage 11 impacts against the anvil it is subjected to an initial compressive force which causes it to contract longitudinally. In partial compensation for the longitudinal contraction, the carriage 11 expands laterally. Though the change in shape is imperceptible to the eye, it nevertheless can be detected by suitable instruments. The dotted outline 11' represents the configuration produced by the compressive force. After impact, when the compressive force is released, the carriage will tend to and does revert to its former dimensions. The aforementioned cycle is elastic and is repeated at a high frequency with decreasing amplitude until the carriage comes to rest. The result is a high frequency internal vibration, the nature of which is depicted in FIGURE 2A.

Digressing briefly to the text "Stress Waves in Solids," Kolsky, published in 1953 by Oxford at the Clarendon Press in England, in pages 87 through 91, there is a brief theoretical discussion concerning the reflection of a compression pulse at a free boundary. In particular, the discussion describes what occurs to a small mass, called a timepiece, which is wrung on, or merely seated on, a larger mass in which a compression force wave is applied. Briefly, by way of summing up the results, the compression pulse when it is reflected, as a tension force wave, from the free boundary causes the small mass, or timepiece, to separate from the large mass. The essence of the text discussion is that compressive forces may pass through the interface of two bodies in contact—but not connected to each other—while tension forces may not.

Applying the foregoing Kolsky theoretical discussion to FIGURE 1, the carriage 11 becomes the large mass, the stress member 13 is the small mass. A surface 17 becomes the free surface and the surface 16 becomes the interface between the small mass (stress member 13) and the large mass (carriage 11).

Thus, a compressive force reaching surface 16, at time $t_0$ for example in FIGURE 2, crosses surface 16 into the stress member 13. After passing through the stress member 13 it reaches the surface 17, which is a free surface, as defined by Kolsky, at time $t_1$ and is reflected therefrom as a tension wave back toward the surface 16 in the carriage 11. When the reflected wave reaches the surface 16, at time $t_2$, the stress member 13 is separated from the carriage 11. Clearly, the subsequent vibrations that occur in the carriage 11 are not transmitted to the stress member 13 since there is no longer any contact between the stress member 13 and the carriage 11. Thus, the stress member 13 absorbs energy from only the first compressive stress wave applied thereto by the carriage 11, through the surface 16.

When the stress member 13 leaves the carriage 11 it has momentum trapped in it which was derived from a portion of the compressive stress wave that passed through it and was reflected. The trapped momentum causes the stress member 13 to accelerate. When an accelerometer is secured to the stress member 13, it is noted that the acceleration is a high amplitude, short duration, acceleration pulse. Arguments respecting the transformation of the shock pulse have not been mathematically substantiated. However, it is significant to note that high amplitude shock pulses derived in the aforementioned procedure are capable of being reproduced with great reliability.

Some observations, however, can be made. The duration of the transformed high amplitude shock pulse is seen, in FIGURE 2, to be equal to the duration of the initial compressive stress wave depicted in FIGURE 2A. It is also obvious from FIGURE 2 that subsequent to time $t_2$, when the applied stress wave from the carriage 11 to the stress member 13 changes from a compressive stress to a tension stress, the stress member 13 acts independently of the carriage 11. In fact, as mentioned heretofore, it is no longer in contact with the carriage 11.

Figure 2B:
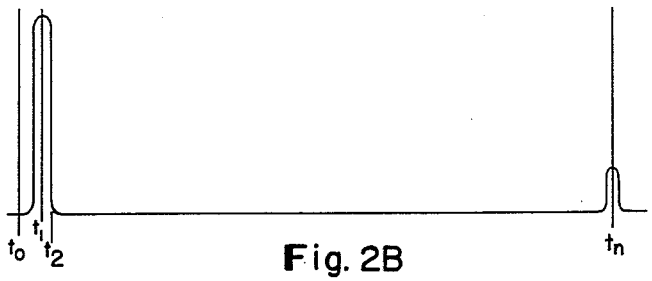

At some future time, $t_n$ for example, the stress member 13 is returned to the carriage 11 and once again receives a compressive stress wave. As indicated in FIGURE 2B, the second compressive stress wave applied to stress member 13 gives rise to a greatly attenuated shock pulse in the stress member 13. For all practical purposes, this second pulse can be ignored.

For the shock machine described in the Jensen et al. patent, the vibration frequency of the carriage is 12.5 kc., thus the minimum duration of the shock pulse is equal to one-half the period of vibration or 40 microseconds (.040 millisecond).

The pulse duration, of necessity, cannot be less than the excitation duration which in the case illustrated, is 40 microseconds. However, the duration of a shock pulse can be increased, although with some loss in amplitude, by inserting a damping device between the stress member 13 and the carriage 11, or as will be seen, between the stress member 13 and a specimen under test. The damping device acts as a low pass filter which prevents the passage of high frequency vibration components to pass through it. Since these high frequency components contribute to the slope of the pulse rise, their absence causes a more gradual slope and a pulse lengthening.

It is quite obvious from the foregoing that the amplitude of the transformed pulse and its duration can be controlled in several ways; e.g., by judiciously choosing a carriage having a predetermined frequency of vibration and by adjusting the damping.

The restraining means 14 is an important component of the transformation fixture 12. As will be seen, it serves to keep the mass member 13 from becoming permanently separated from the carriage 11 and it also provides an efficient method for securing specimens to be tested to the stress member 13 and for isolating the stress member 13 from the carriage 11, from undesirable shock and vibration stresses.

Figure 3:
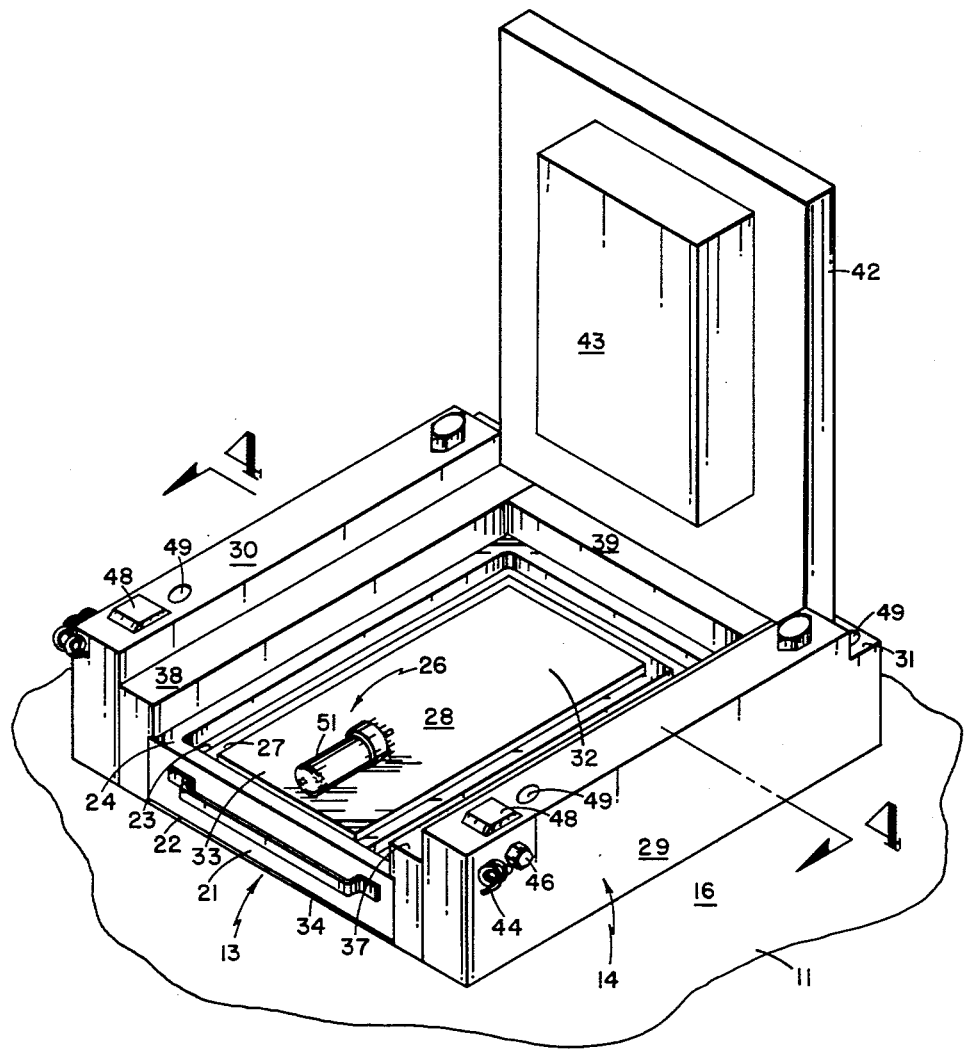
FIGURE 3 shows a pictorial representation of a transformation fixture embodying the principles of the present invention.

*Description of the FIGURE 3 Shock Transformation System*

Figure 4:
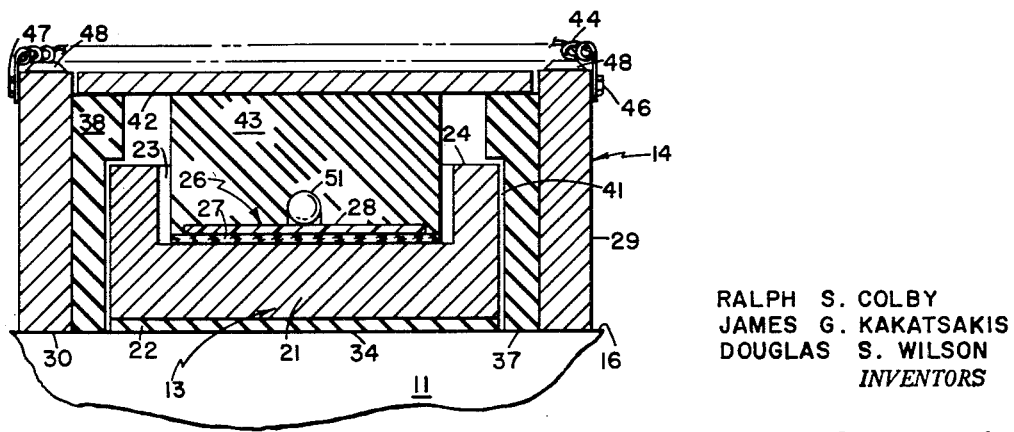
FIGURE 4 is a cross section taken along lines 4 in FIGURE 3.

A preferred construction of a shock transformation system is shown in FIGURES 3 and 4 of the drawings. Numbers used in the foregoing discussion will be carried over into the discussion on the preferred embodiment to identify similarly functioning members. There is included a means, comprising preferably a carriage 11 of a shock testing machine, for supplying high frequency shock excitation. The carriage 11 includes a flat surface 16 through which shock excitation is transmitted.

The system for producing a high amplitude shock pulse also includes a stress member 13 comprising a tray 21 designed to sit on the surface 16 for receiving and absorbing shock excitation. As seen more clearly in FIGURE 4, there is secured to the bottom surface of the tray a pad 22 made preferably from rubber or other high frequency shock transmitting material. The tray 21 also includes a depression 23 opening in a top surface 24.

A damping means 26 is secured to the bottom of the depression 23. The damping means 26 comprises a sheet of inelastic material 27, preferably cardboard, with felt being an acceptable alternative material. The characteristics of inelastic material are not critical. Its purpose is to filter out the high frequency components of the shock excitation applied to the tray 21 and thus increase the rise time and decay time of a shock pulse passing through it.

Overlying the inelastic material 27 is a sheet of hard surfaced material, such as phenolic 28, the top surface of which for purposes of this discussion represents the mounting surface for test specimens. The phenolic 28 minimizes permanent deformation of the relatively soft inelastic material 27 during a testing procedure.

The system for producing a high amplitude shock pulse also includes a restraining member 14. As seen in FIGURES 3 and 4, the restraining member 14 comprises three peripheral walls 29, 30 and 31 defining a top opening 32, a side opening 33, and a bottom opening 34, the latter formed to conform with the surface 16 for receiving shock excitation uniformly.

There is provided within the restraining member 14, attached to the interior surface of the peripheral walls 29, 30 and 31, isolating means comprising L-shaped resilient members 37, 38 and 39, formed preferably of rubber. The lower portion of the resilient members 37, 38 and 39 have a reduced thickness and define a lower compartment 41 which loosely contains the tray 21 as shown in FIGURE 4.

Pivotly secured to the restraining means 14 is a cover 42 adapted to fit inside the top opening 32 and to abut against the top surfaces of the resilient members 37, 38 and 39. The cover 42 provides for easy access into the restraining member 14 and to the tray 21, in particular. Depending from the cover 42 is an extremely soft foam pad 43 which acts as a restraining means for test specimens as will be shown hereinafter.

The cover 42 is locked in a closed position by means of a spring 44 secured to walls 29 and 30 by means of bolts 46 and 47. See FIGURE 4. The spring 44 is adapted to slide over a pair of resilient isolating bumpers 48 for securing the cover 42 in a closed position. The spring 44 is shown in a secured position in FIGURE 4 and in an unsecured position in FIGURE 3.

There are provided a plurality of passages 49 in the peripheral walls 29, 30 and 31 for securing the restraining means 14 to the surface 16. As will be noted, in FIGURE 4 the tray 21 is isolated from all sources of shock excitation and spurious reactions. For example, partly because of its loose fit and partly because of the isolating abilities of the resilient members 37, 38 and 39, spurious shock conditions set up in the peripheral walls 29, 30 and 31 are not transmitted to the tray 21. The rubber pad 22 secured to the bottom surface of the tray 21 is not sufficiently thick to isolate the tray from the shock excitation generated in the carriage 11 and applied to the tray 21 through surface 16. However, the rubber pad 22 virtually eliminates the transfer of low frequency spuria across the boundary of surface 16 to the tray 21.

The numeral 51 designates a test specimen, in this case a glass vacuum tube. The test specimen as seen in FIGURE 4 is placed on the phenolic board 28 and is secured in this position by the foam pad 43. It is quite obvious that with small test specimens of this type, and generally only small test specimens are required to undergo these high amplitude shock pulses, it is possible to test a number of specimens at the same time without any increase in complexity of the holding member, pad 43.

The transformation fixture 12, including restraining means 14 and the stress member 13 complements most standard shock testing machines to provide high amplitude shock duration pulses through a transformation of shock excitation from a low amplitude level to a high amplitude level.

The preferred embodiment depicted in FIGURES 3 and 4 also provides an easily operated structure for shock exciting small components such as electron tubes, transistors, resistors, and condensers in a simple and facile manner and in numbers which are consistent with mass production quality control procedures.

Summarizing briefly, the transformation fixture 12 in combination with a low amplitude shock excitation supply means provides a convenient and reliable means for amplifying the magnitude of the applied low amplitude shock excitation and subjecting a specimen to a high amplitude shock pulse.

If the amplitude ratio of the high amplitude shock pulse and the low amplitude shock excitation is considered as a transformation ratio, it is seen that this ratio could be changed and adjusted by simply changing the damping means.

A coarser adjustment of the transformation ratio is made by changing the mass ratio of the stress member in relation to the mass of the shock excitation supply means.

It was pointed out that the stress member 13 is propelled out of contact with the shock excitation supply means and, thus, as a practical matter responds only to the first compressive stress wave. In an analogous manner the specimen seated on the stress member is believed to be propelled away from the stress member and thus is free from the influence of any spurious vibration-type signals set up within the stress member itself. Note, therefore, that the relatively loose coupling serves to further the aims and the objectives of this invention.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A system for subjecting a specimen to a high amplitude shock pulse comprising: a stress member and specimen holder designed to abut a surface to form a free boundary therewith for receiving and absorbing a compressive stress wave; restraining means to loosely confine said stress member on to said surface and for enabling said stress member to move out of contact with said surface when said stress member absorbs a compressive stress wave; and means for supplying at least one compressive stress wave, said means including said surface for transmitting compressive stress waves to said stress member.

2. A system for subjecting a specimen to a high amplitude shock pulse as described in claim 1 in which said compressive stress wave is found in a high frequency oscillating wave.

3. A system for subjecting a specimen to a high amplitude shock pulse as described in claim 1 which includes, in addition, resilient isolating means interposed between said restraining means and said stress member for minimizing the transfer of spurious signals to said stress member.

4. A system for subjecting a specimen to a high amplitude shock pulse as described in claim 1 which includes in addition a resilient means interposed between the stress member and the surface for facilitating the transfer of high frequency components of the aforementioned compressive stress wave to said stress member.

5. A system for subjecting a specimen to a high amplitude shock pulse as described in claim 1 which includes, in addition, damping means associated with said stress member interposed between said stress member and test specimens placed thereon for modifying the amplitude and duration of the shock pulse transferred from said stress member to the test specimens.

6. A system for subjecting a test specimen to a high amplitude shock pulse comprising: means for supplying a low amplitude, high frequency compressive stress wave including a surface for transmitting the compressive stress wave; restraining means defining a compartment having a bottom opening; a stress member and specimen holder comprising a tray dimensioned to fit loosely within the aforementioned compartment and to abut the surface through said bottom opening for receiving and absorbing the compressive stress wave, said tray also including a depression; and damping means situated in the aforementioned depression and adapted to be interposed between said stress member and test specimens for modifying the amplitude and duration of the high amplitude shock pulse translated through the damping means from said stress member to the test specimens.

7. A system for subjecting a specimen to a high amplitude shock pulse as described in claim 6 in which said damping means comprises an inelastic material in contact with the stress member covered by a hard surfaced material intended to contact the test specimens.

8. A system for subjecting a specimen to a high amplitude shock pulse comprising: means for supplying a low amplitude compressive stress wave including a first surface for transmitting the compressive stress wave; restraining means having a bottom and a top opening, said restraining means including a compartment, one side of which is the bottom opening; a stress member and specimen holder comprising a tray dimensioned to fit loosely within the aforementioned compartment and to abut the first surface through said bottom opening for receiving and absorbing the compressive stress wave, said tray also including a depression defined through the top surface thereof; damping means secured in the aforementioned depression and adapted to have test specimens placed thereon, said damping means being provided for modifying the amplitude and duration of the shock pulse transferred from said stress member to the test specimens; a cover dimensioned to close the top opening of said restraining means; and means depending from said cover to contact test specimens situated on the aforementioned damping means for loosely maintaining the test specimens in position on said damping means.

9. A shock transformation fixture for transforming low amplitude shock vibration excitation supplied at a surface into a high amplitude shock pulse comprising: a restraining means to be secured to the surface having peripheral walls extending from the surface which define a bottom opening conforming to the surface; resilient means secured to the peripheral walls dimensioned to define a lower compartment including the bottom opening as one side thereof; a stress member comprising a mass dimensioned to fit loosely in the lower compartment and to abut the surface for receiving and absorbing the low amplitude compressive stress wave.

10. A shock transformation fixture as described in claim 9 in which said stress member includes a lower surface on which is secured resilient means for transmitting high frequency shock or vibration excitation to said stress member.

11. A shock transformation fixture for transforming low amplitude shock or vibration excitation supplied at a first surface into a high amplitude shock pulse for subjecting test specimens to a high amplitude shock pulse comprising: a restraining means to be secured to the first surface having peripheral walls extending from the surface which define a bottom opening conforming to the surface, said restraining means also including a compartment having the bottom opening as one side thereof; a stress member and specimen holder comprising a mass dimensioned to fit loosely in the compartment and to abut the first surface for receiving and absorbing the low amplitude excitation, said stress member including a second surface on which a test specimen is placed; and stress insulating means connected to said restraining means for engaging the test specimen and maintaining the test specimen in loose contact with said stress member.

12. A shock transformation fixture for transforming low amplitude compressive stress supplied at a first surface into a high amplitude shock pulse comprising: restraining means to be secured to the first surface having peripheral walls defining a bottom opening conforming to the first surface and a top opening; shock insulating members secured to the interior surface of the peripheral walls dimensioned to form a compartment including the bottom opening as one side thereof; a stress member dimensioned to fit loosely in the compartment to overlie the bottom opening for receiving and absorbing the compressive stress wave; and a cover pivotly mounted to a peripheral wall for providing access into said compartment.

13. A shock transformation fixture as described in claim 12 which includes, in addition, damping means secured to said stress member for modifying the amplitude of the shock wave applied thereto to said stress member.

14. A shock transformation fixture as described in claim 13 in which said damping means comprises an inelastic member in contact with said stress member and a hard surfaced material overlying said inelastic material and in contact therewith.

15. A shock transformation fixture for transforming low amplitude shock or vibration excitation supplied at a first surface into a high amplitude shock pulse for subjecting test specimens to a high amplitude shock pulse comprising: a restraining means to be secured to the first surface having peripheral walls having a bottom opening conforming to the first surface, a top opening and a side opening; shock insulating members secured to the interior surface of the peripheral walls defining a right parallelepiped compartment; a stress member dimensioned to complement and to fit loosely in said compartment and to overlie the bottom opening for receiving and absorbing the compressive stress wave; and a cover pivotally mounted to a peripheral wall and dimensioned to cover said top opening.

References Cited in the file of this patent
UNITED STATES PATENTS

| | | |
|---|---|---|
| 2,732,040 | De Vost et al. | Jan. 24, 1956 |
| 2,740,286 | De Vost et al. | Apr. 3, 1956 |
| 2,890,766 | Sargeant | June 16, 1959 |
| 2,955,456 | Jensen et al. | Oct. 11, 1960 |